Jan. 4, 1927.
H. W. RIECK
1,612,945
GOAT AND SHEEP COAT
Filed August 25, 1925
2 Sheets-Sheet 2
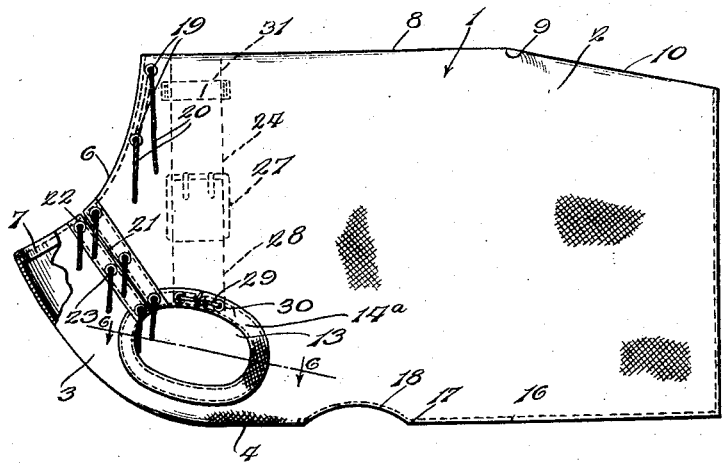
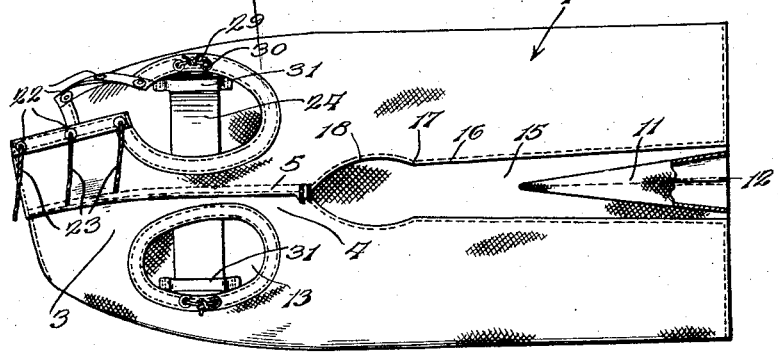
Inventor
H. W. Rieck
By Lacy & Lacy, Attorney Patented Jan. 4, 1927.

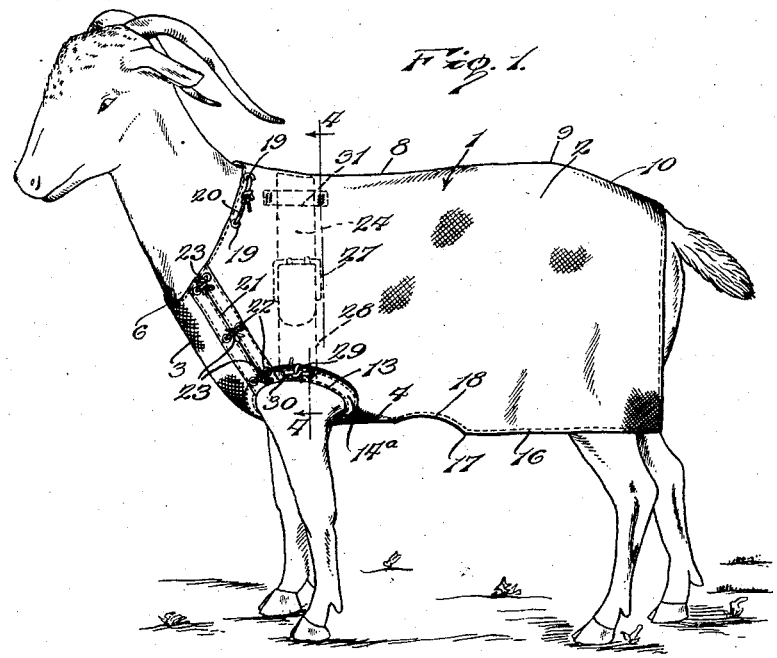
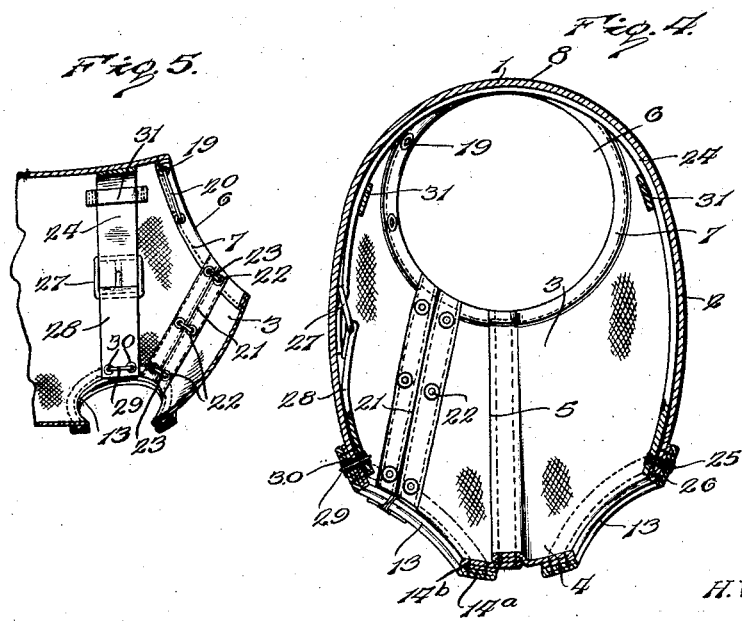

1,612,945

UNITED STATES PATENT OFFICE.

HUGH W. RIECK, OF ROOSEVELT, TEXAS.

GOAT AND SHEEP COAT.

Application filed August 25, 1925. Serial No. 52,414.

This invention relates to improvements in goat and sheep coats and constitutes an improvement over the coat disclosed in my Patent No. 1,553,632, granted September 15, 1925.

It is the general object of the present invention to provide a coat which may be applied to goats or sheep immediately following the shearing operation, so as to protect them from the inclemencies of the weather and thus prevent large numbers of them dying from exposure as has heretofore been the case, thereby not only avoiding the losses entailed through the death of the animals, but also eliminating the expenses incident to the erection of sheltering sheds and the employment of herders, the coat being adapted to be readily slipped onto the animal to be protected and to fit or conform to the body contour of the animal in such a way as to most effectually serve its purpose as a protecting medium, protection being afforded for the delicate parts of the anatomy in the most effective manner, and due provision being made for freedom of limb movement. In carrying out the invention as disclosed in my prior patent, it has been found that while, by far, the coats will more or less snugly fit the animals, there is in each flock, a small percentage of animals which cannot be as snugly and comfortably fitted as is essential. Therefore, the invention has as one of its objects to provide novel means whereby such a coat may be more snugly adapted to fit the animal wearing the same, so as to afford the desired protection.

More specifically, it is an object of the present invention to provide novel means whereby the portion of the coat which is to cover the shoulders and back of the neck of the animal may be drawn snugly to these parts of the body.

Another object of the invention is to provide novel means whereby the neck opening of the coat may be more or less constricted to fit snugly about the neck of the animal, if it should be found that the neck opening is too large.

Another object of the invention is to provide a goat or sheep coat having its portion immediately in rear of its neck opening so constructed that the coat may be passed over the horns of rams, where the spread of the horns is too great to permit of the coat being applied otherwise.

Another object of the invention is to provide a novel reenforcement for the leg openings of the coat which will serve to prevent tearing of the material of the coat at these points and yet not prove uncomfortable to the animal.

In the accompanying drawings:

Figure 1 is a perspective view of the coat embodying the invention applied to a shorn Angora goat.

Figure 2 is a side elevation of the coat removed, parts being broken away.

Figure 3 is a bottom plan view of the coat.

Figure 4 is a vertical transverse sectional view in detail, taken substantially on the line 4—4 of Figure 1, looking in the direction indicated by the arrows, the coat being removed from the animal.

Figure 5 is a vertical sectional view through the forward portion of the coat.

Figure 6 is a detail longitudinal sectional view taken substantially on the line 6—6 of Figure 2, looking in the direction indicated by the arrows.

The coat comprises, generally speaking, a back portion indicated in general by the numeral 1, side portions 2, a breast portion 3, and a bottom portion 4. In the manufacture of the coat, a blank of the proper marginal contour is cut from a single piece of cloth of suitable size, and the blank is folded longitudinally medially along what will constitute the back of the coat in its completed form, the lateral front marginal portions of the blank being united by a seam 5 extending longitudinally along the breast portion 3 and the bottom portion 4 of the coat. The front of the coat between the forward end of the back portion 1 and the upper end of the breast portion 3 is provided with a neck opening indicated by the numeral 6, which is preferably hemmed at its margin as indicated by the numeral 7. The opposite sides of the neck opening 6 do not extend on a diagonal line, as will be evident by reference to Figure 2 of the drawings, but are preferably extended on an inwardly curved line as shown in the said figure. From the upper side of the neck opening 6, the back portion 1 of the coat extends rearwardly on a substantially straight line, as indicated by the numeral 8, and to a point 9 located, in the applied position of the coat, substantially above the forward portions of the hips of the animal. From this point, the back 1 is extended downwardly and rearwardly at an angle of inclination, as indicated by the numeral 10, this change in contour being effected by forming a plait 11 in the said back portion 1, gradually decreasing in transverse dimensions from the point 9 to the rear end of the said back portion, as shown in Figure 3 of the drawings, and permanently established by a line of stitching 12, as shown in the said figure. By referring now to Figure 1 of the drawings, it will be observed that the provision of the plait 11 not only serves to shape the upper side of the back portion 1 so that it will conform closely to the contour of the back of the animal, but also forms, in effect, a pad which prevents the seam produced by the line of stitching 12, from chafing or rubbing the animal's back. The breast portion 3 of the coat is gradually curved downwardly and rearwardly from the lower side of the neck opening 6 and merges with the bottom 4, as clearly shown in Figures 1 and 2 of the drawings, and it will be evident by an inspection of Figure 1, that the breast portion will effectually cover and protect the breast of the animal and that the bottom portion 4 will likewise cover and protect the under side of the body of the animal between the forelegs.

To accommodate the animal's forelegs, the front portion of the coat is provided, substantially at the forward side of the bottom portion 4 and the lower or rear side of the breast portion 3, with oppositely located openings indicated by the numeral 13, the material surrounding these openings being preferably overturned, and a reenforcing strip 14 being applied to the overturned marginal portion of the material about each opening and having its marginal portions turned over in an inward direction upon themselves, as at 14ª, and stitched as at 14ᵇ, to the outer side of the coat so as to extend continuously around the respective openings. In the applied position of the coat the openings 13 will more or less snugly receive the upper portions of the forelegs of the animal although this portion of the coat will not fit so closely as to in any way interfere with the natural limb movement. On the other hand, the fit is sufficiently snug to insure of automatic adjustment of the coat, in the act of the animal walking, should the coat for any reason become slightly disarranged or displaced. In other words, while there is perfect freedom of movement of the forelegs and no likelihood of chafing should the coat, for example, become rearwardly shifted upon the animal's body or, on the other hand, forwardly shifted, the strides taken by the animal in the act of walking will immediately serve to readjust the coat to its properly arranged position. In applying the coat to the animal, the forelegs are, in turn, bent back at the knee joint and inserted, in this position, through the respective leg openings 13, these openings being of sufficient dimensions to permit of this being done and being preferably of the elliptical form shown in Figures 2 and 3 of the drawings.

It will be observed that the bottom portion 4 of the coat is closed but that rearwardly of this portion, the bottom of the coat is left open, as indicated by the numeral 15, the margin of this portion of the coat, indicated by the numeral 16, being continued from a point 17, located in rear of the forelegs of the animal, along straight substantially horizontal lines to the rear end of the coat. Between the point 17 and the rear end of the closed bottom portion 4, however, the margins 16 are cut away along upwardly and laterally curved lines, as indicated by the numeral 18.

While, under ordinary conditions, if the sides 2 of the coat were integrally formed at their forward portions, substantially at the neck opening 6, the neck of the coat would snugly fit about the neck of the animal, nevertheless, there are times when a coat of a given size will be found to fit too loosely when applied to a particular one of the animals, and, therefore, provision is made for somewhat restricting the neck opening if this should be found necessary. With this end in view, a pair of eyelets 19 are secured in the material of the coat at one side of the neck opening 6, preferably near the upper side of said opening, and a draw string 20 is threaded through these eyelets and the ends of the string may be pulled so as to more or less pucker the portion of the neck of the coat between the eyelets, and the string then tied in a bow knot, thus causing the neck of the coat to more snugly fit the neck of the animal.

Where the coat embodying the invention is properly proportioned to fit the animal to be protected from the weather, but where the animal is a ram, it is sometimes found difficult to fit the neck of the coat over the head of the animal because of the widely projecting horns. Therefore, the present invention contemplates dividing the coat at one side along a diagonal line, as indicated by the numeral 21, between the neck opening 6 and one of the respective leg openings 13, so that the coat may be thrown open at this portion and more readily engaged over the horns of the male animal. Ordinarily, however, this will be unnecessary, and in order that the division in the side of the coat may be kept closed, eyelets 22 are arranged in a series along each side of the line of division 21 and draw strings 23 are threaded through the oppositely located eyelets and are adapted to have their end portions tied together so as to close the coat as stated.

In order that, when necessary, the forward portion of the coat at the top and sides thereof may be caused to fit snugly about the animal and over its shoulders, it is contemplated by the present invention that a strap 24 be connected at one of its ends by a draw string 25 passing through eyelets 26 in the coat at the upper side of one of the foreleg openings 13 therein, the strap being led upwardly along the inner side of the respective side portion of the coat, beneath the top portion of the coat at the front thereof, and thence downwardly along the inner side of the opposite side portion of the coat and engaged adjustably with a buckle 27 carried by the end of a short strap 28 which is detachably secured at its other end by a draw string 29, to the coat at the upper side of the other leg opening 13, the draw string being passed through eyelets 30 provided in this portion of the coat. The strap 24 is led through loops 31 secured transversely to the inner side of the coat rearwardly of the upper portion of the neck opening therein. It will be understood at this point that by adjusting the strap 24 with respect to the buckle 27 with which it is engaged the coat, through the medium of the loops 31, may be drawn more snugly about the shoulders of the animal and caused to fit more snugly than would otherwise be the case. Inasmuch as the straps 24 and 28 are detachably connected with the coat at the opposite sides thereof, the said straps may be detached or, to view the matter in another light, the mere provision of the eyelets 26 and 30 permits of the attachment of the straps in the event it is found that the coat when first applied to the animal, does not fit with sufficient snugness at its forward portion. Inasmuch as the straps are arranged upon the inner side of the coat, there is no likelihood of the straps being torn loose through contact with underbrush or being torn loose by other goats, and this is likewise true of the loops through which the strap 24 is passed.

Having thus described the invention, what I claim is:

1. An animal coat comprising top, side and front portions, the coat being provided at its front with a neck opening and openings for the forelegs of the animal, the coat being divided along a line extending from the neck opening to one of the leg openings, and means for closing the coat along its line of division.

2. An animal coat comprising top, side and front portions, the coat being provided at its front with a neck opening and openings for the forelegs of the animal, the coat being divided along a line extending from the neck opening to one of the leg openings, oppositely located eyelets arranged in a series along the line of division of the coat, and draw strings threaded through the eyelets of each set and constituting means for closing the coat along its line of division.

3. An animal coat comprising top, side and front portions, the coat being provided at its front with a neck opening and with openings for the forelegs of the animal, straps connected at their ends to the coat at the inner side thereof adjacent the upper side of respective ones of the leg openings and extended transversely along the inside of the coat, and means adjustably connecting the free ends of the said straps.

4. An animal coat comprising top, side and front portions, the coat being provided at its front with a neck opening and with openings for the forelegs of the animal, straps connected at their ends to the coat at the inner side thereof adjacent the upper side of respective ones of the leg openings and extended transversely along the inside of the coat, means adjustably connecting the free ends of the said straps, and loops upon the inner side of the coat at opposite sides of the upper portion thereof through which one of the said straps is engaged.

5. An animal coat comprising top, side and front portions, the coat being provided at its front with a neck opening and with openings for the forelegs of the animal, and means whereby the forward portion of the coat may be adjusted to the animal, the said means comprising straps detachably connected at their relatively remote ends to the inner side of the coat at the upper sides of respective ones of the leg openings, and means adjustably connecting the other ends of the said straps.

6. An animal coat comprising top, side and front portions, the coat being provided at its front with a neck opening and with openings for the forelegs of the animal, eyelets arranged at the upper sides of the said leg openings, straps having their relatively remote ends disposed against the inner side of the coat at the said upper sides of the said leg openings, draw strings engaged with the said ends of the straps and threaded through the said eyelets and constituting means for detachably connecting the straps with the coat, and means adjustably connecting the other ends of the straps.

7. An animal coat comprising top, side and front portions, the coat being provided at its front with a neck opening and with openings for the forelegs of the animal, eyelets arranged at the upper sides of the said leg openings, straps having their relatively remote ends disposed against the inner side of the coat at the said upper sides of the said leg openings, draw strings engaged with the said ends of the straps and threaded through the said eyelets and constituting means for detachably connecting the straps with the coat, means adjustably connecting the other ends of the straps, and loops upon the inner side of the coat at opposite sides of the upper portion thereof to retain the straps in place.

In testimony whereof I affix my signature.

HUGH W. RIECK. [L. S.]